US011256245B2

(12) United States Patent
Akkaram et al.

(10) Patent No.: US 11,256,245 B2
(45) Date of Patent: Feb. 22, 2022

(54) MODEL FOR PREDICTING DISTRESS ON A COMPONENT

(71) Applicant: GENERAL ELECTRIC COMPANY, Schenectady, NY (US)

(72) Inventors: Srikanth Akkaram, Mason, OH (US); Karan Oberoi, Bengaluru (IN); Vasanth Muralidharan, Bengaluru (IN); Michael Howard Fisher, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 16/232,700

(22) Filed: Dec. 26, 2018

(65) Prior Publication Data

US 2020/0209843 A1 Jul. 2, 2020

(51) Int. Cl.
G05B 23/02 (2006.01)
B64F 5/60 (2017.01)
B64F 5/40 (2017.01)

(52) U.S. Cl.
CPC ............ *G05B 23/0283* (2013.01); *B64F 5/40* (2017.01); *B64F 5/60* (2017.01); *G05B 23/0254* (2013.01); *G05B 23/0294* (2013.01)

(58) Field of Classification Search
CPC ............ G05B 23/0283; G05B 23/0294; G05B 23/0254
See application file for complete search history.

(56) References Cited

U.S. PATENT DOCUMENTS

| | | | |
|---|---|---|---|
| 6,799,154 B1 | 9/2004 | Aragones et al. | |
| 6,823,675 B2 | 11/2004 | Brunell et al. | |
| 7,328,128 B2 | 2/2008 | Bonanni et al. | |
| 8,335,601 B2 | 12/2012 | Sham et al. | |
| 8,452,475 B1 | 5/2013 | West et al. | |
| 9,477,224 B2 | 10/2016 | Khan et al. | |
| 10,042,964 B2 | 8/2018 | Kessie et al. | |
| 2004/0225474 A1* | 11/2004 | Goldfine | G05B 23/0245 702/183 |
| 2007/0198215 A1* | 8/2007 | Bonanni | G05B 23/0283 702/183 |
| 2009/0228408 A1* | 9/2009 | Kaushal | G06N 20/00 706/12 |
| 2016/0259873 A1* | 9/2016 | Kessie | G06Q 10/0635 |
| 2018/0173217 A1* | 6/2018 | Spiro | G05B 23/0264 |

OTHER PUBLICATIONS

Extended European Search Report from EP Appl. No. 19215662.8, dated May 18, 2020.
Alberto Bemporad et al., "Model Predictive Control Toolbox For Use with MATLAB," The MathWorks User's Guide, Version 2, Mar. 1, 2005, pp. 1-246, Entire document retrieved from the Internet on Apr. 30, 2020: URL:https://instruct.uwo.ca/engin-sc/391b/downloads/mpc.pdf.

* cited by examiner

*Primary Examiner* — Imran K Mustafa
(74) *Attorney, Agent, or Firm* — Wood IP LLC

(57) ABSTRACT

An apparatus and method for predicting distress on a physical component. The method can include obtaining distress data. The distress data can be used to determine a distress rank. The distress rank can be compared to a distress output provided by a kernel that use parameters related to the physical component. The comparison can result in a prediction model for the physical component.

21 Claims, 4 Drawing Sheets

MODEL FOR PREDICTING DISTRESS ON A COMPONENT

BACKGROUND

Evaluating diagnostics and prognostics of physical parts of a machine is useful for scheduling maintenance or repair or replacement of the parts, particularly where the parts operate in high stress environments such as the components of aircraft engines. Dependable evaluation within complex systems permits operators or maintenance personnel to reliably and predictably inspect and repair the components, as well as maintain high operational efficiency and quality of the components. For example, with respect to the aircraft engine, early detection of hardware distress is vital to preventing in-flight shutdowns, unplanned engine removals, or secondary hardware damage. With earlier accurate prediction, system planners can more readily schedule maintenance and replace hardware without the need for a full system overhaul.

BRIEF DESCRIPTION

The present disclosure relates to a method of predicting distress on a physical component that includes: a. obtaining a first set of distress data for a physical component, b. determining a distress rank of the physical component based on first set of distress data, c. obtaining at least one of a set of environmental data and a set of operational data related to the physical component, d. formulating a kernel using parameters of at least one of the set of environmental data and the set of operational data and a cumulative damage model related to the physical component, e. generating a predictive model based on the kernel that provides a distress output related to the physical component, f comparing the distress output to the distress rank, g. tuning the predictive model based on the comparing the distress output to the distress rank by adjusting at least one parameter of the kernel and generating an updated predictive model, h. repeating steps d-g until no more adjustments to the at least one parameter can effectively be made; and i. if the difference is within the threshold, applying the updated predictive model to the physical component to predict distress on the physical component, or if the difference is outside the threshold, restarting the method at step a.

The present disclosure relates to a system for predicting distress on a physical component, where the systems includes a memory storing distress data, environmental data and operational data related to a physical component, a distress rank module coupled to the memory configured to access a first set of distress data for the physical component, and to determine a distress rank of the physical component based on the first set of distress data, a predictive module coupled to the distress rank module and to the memory, configured to access at least one of a set of environmental data or a set of operational data related to the physical component, formulate a kernel using parameters of at least one of a set of environmental data and a set of operational data and a cumulative damage model related to the physical component, and generate a predictive model based on the kernel that provides a distress output related to the physical component, and a controller coupled to the memory, the distress rank module, and the cumulative damage module, configured to compare the distress output to the distress rank, tune the predictive model by adjusting at least one parameter of the kernel and generate an updated predictive model if a difference between the distress output and the distress rank of the physical component exceeds a predetermined threshold, repeat the comparing and tuning until no more adjustments to the at least one parameter can effectively be made, and apply the updated predictive model to the physical component to predict distress on the physical component if the difference is within the threshold.

DETAILED DESCRIPTION

Figure 1:
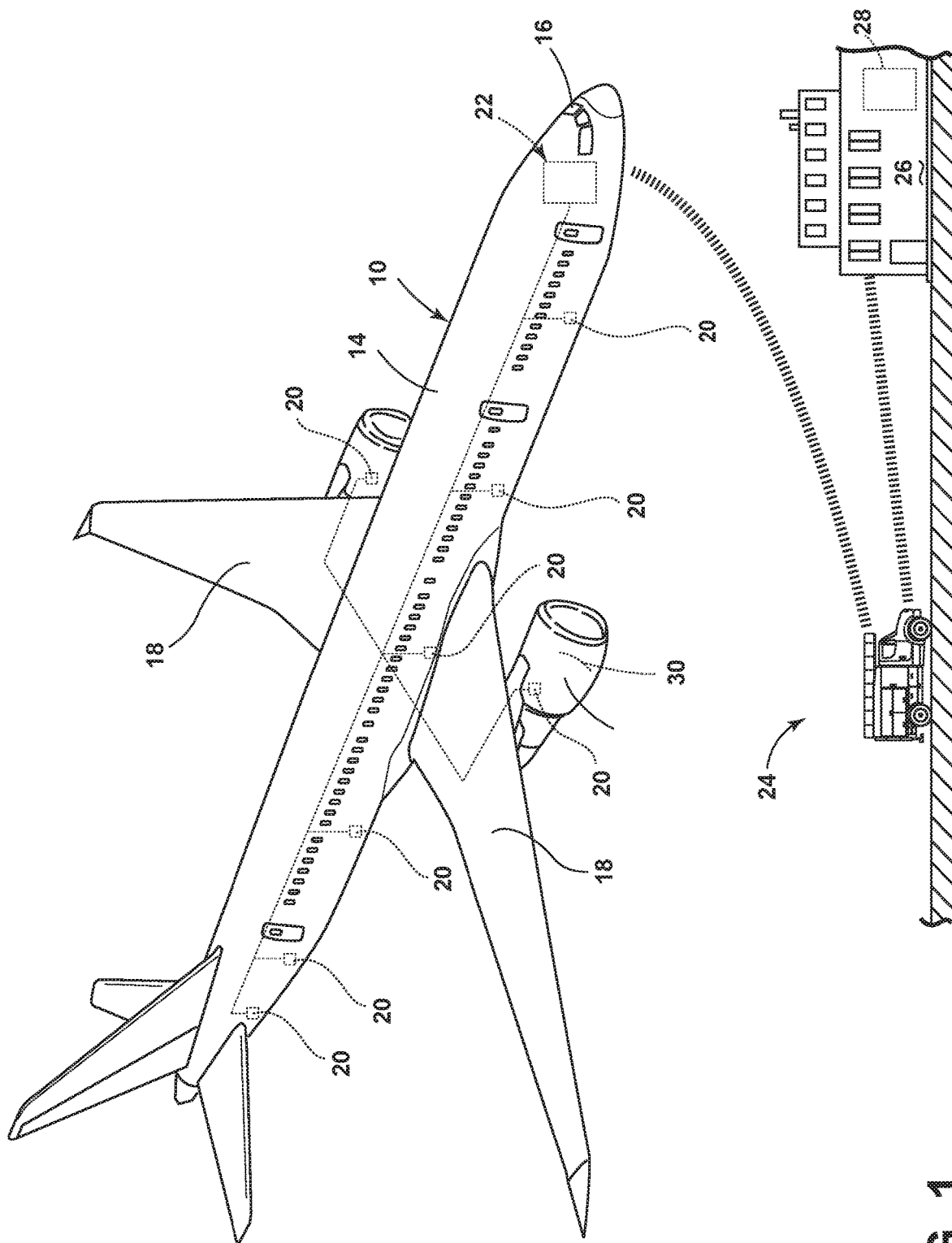
FIG. 1 is a perspective view of an aircraft and data controller

Aspects of the disclosure described herein are directed to a method and apparatus for predicting distress on a physical component, as well as inspecting and developing a model for determining damage on the physical component and predicting distress based upon such analysis. For purposes of illustration, the present disclosure will be described with respect to a component for an aircraft turbine engine. It will be understood, however, that aspects of the disclosure described herein are not so limited and can have general applicability within an engine as well as in non-aircraft applications, such as other mobile applications and non-mobile industrial, commercial, and residential applications, and need not be limited to the aircraft or aircraft engine realm.

It will be understood that details of environments that can implement aspects of the present disclosure are set forth in order to provide a thorough understanding of the technology described herein. It will be evident to one skilled in the art, however, that aspects of the present disclosure can be practiced without these specific details. The drawings illustrate certain details of specific aspects of the present disclosure that implement a module or method, or computer program product described herein. However, the drawings should not be construed as imposing any limitations that can be present in the drawings. The method and computer program product can be provided on any machine-readable media for accomplishing their operations. Aspects of the present disclosure can be implemented using an existing computer processor, or by a special purpose computer processor incorporated for this or another purpose, or by a hardwired system.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, Digital Versatile Discs (DVDs), Compact Disc Read-only Memory (CD-ROMs), etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

In another non-limiting example, a control module can include comparing a first value with a second value, and operating or controlling operations of additional components based on the satisfying of that comparison. For example, when a sensed, measured, or provided value is compared with another value, including a stored or predetermined value, the satisfaction of that comparison can result in actions, functions, or operations controllable by the controller module. As used, the term "satisfies" or "satisfaction" of the comparison is used herein to mean that the first value satisfies the second value, such as being equal to or less than the second value, or being within the value range of the second value. It will be understood that such a determination can easily be altered to be satisfied by a positive/negative comparison or a true/false comparison. Example comparisons can include comparing a sensed or measured value to a threshold value or threshold value range.

FIG. 1 schematically depicts one aspect of the present disclosure as an exemplary environment where the diagnostic and prognostic model herein described can be effectively used. An aircraft 10 is shown during a maintenance operation transmitting data, ultimately, to a data operations center 26 that will execute aspects of the present disclosure including the diagnostic and prognostic model presented herein. The aircraft 10 includes one or more complex systems that include a multitude of parts therein, the complex systems relating to various aspects of the aircraft. The aircraft includes one or more propulsion engines 12, a fuselage 14 with a cockpit 16 positioned in the fuselage 14, where the one or more propulsion engines 12 is coupled to the fuselage 14 directly or, as shown, by way of wing assemblies 18 extending outward from the fuselage 14. It will be appreciated that each of the engines 12, the fuselage 14 including the cockpit 16, and the wing assemblies 18 have many, many individual physical components, such as motors, fans, conduits, structural members, wiring harnesses, switches, relays, electrical junctions, sensors, displays, panels, and the like. While a commercial aircraft has been illustrated, it is contemplated that aspects of the present disclosure can be used in any type of complex system, including, for example, power plants, ships, trains, buildings, space craft, and aircraft different than aspects of the present disclosure, including fixed-wing, rotating-wing, rocket, personal aircraft, etc.

The complex of systems in the aircraft can include a plurality of aircraft subsystems 20 that enable proper operation of the aircraft 10 and can include one or more computers or controllers 22, which can be operably coupled to the plurality of aircraft subsystems 20 to control their operation. While only a single controller 22 has been illustrated, it is contemplated that any number of controllers 22 can be included in the aircraft 10. In such an instance, the controller 22 can also be connected with other controllers of the aircraft 10. The controller 22 can include or be associated with any suitable number of individual microprocessors, power supplies, storage devices, interface cards, auto flight systems, flight management computers, and other standard components. In addition to components for the proper operation of the aircraft, an aircraft subsystem 20 can include sensor components for observing, gathering and transferring data related to the operational life of the parts of the system. The transferred data can then be communicated to the one or more controllers 22.

The sensor components will be proximate to or in some way coupled to any of the aircraft parts to observe and generate the data to be transmitted to the one or more controllers 22. The data can include, for example, operation measurements, environmental measurements, flight path, altitude, or the amount of time or number of cycles that a given aircraft part is subject to various levels of pressure, temperature, or strain. Such data may termed "operational data" related to a given component of the aircraft.

The controller 22 can be communicably coupled to one or more communication links to transmit data to and from the aircraft 10. It is contemplated that the communication links can be wireless communication links and can be any variety of communication mechanism capable of wirelessly linking with other systems and devices and can include, but is not limited to, packet radio, satellite uplink and/or downlink, Wireless Fidelity (WiFi), WiMax, Bluetooth, ZigBee, 3G wireless signal, code division multiple access (CDMA) wireless signal, global system for mobile communication (GSM), 4G wireless signal, 5G wireless signal, long term evolution (LTE) signal, Ethernet, or any combinations thereof. It will also be understood that the particular type or mode of wireless communication is not critical to aspects of the present disclosure, and later-developed wireless networks are certainly contemplated as within the scope of the present disclosure. Further, the communication links can include one or more radios including voice, aircraft communications addressing and reporting system (ACARS)-analog, ACARS-digital, satellite communication (SAT-COM), cellular, etc. The communication links can allow for communication with maintenance personnel via, for example a maintenance vehicle 24, ground controllers or data operations center 26 at a ground-based station or with non-ground stations such as satellite (not shown).

Further, while it has been illustrated that the transmitted data from the aircraft 10 is communicated to the data operations center 26 via a maintenance vehicle 24, it will be understood that the aircraft 10 can communicate directly with the data operations center 26 utilizing the communication links. At the data operations center 26, a data controller 28 can receive, store, or process the transmitted data from the aircraft 10. While the data transferred the aircraft 10 will include operational data from sensors proximate to or coupled with the monitored parts, the data will also include environmental data such as weather data, geographical location, satellite images, and any other data or information or knowledge about the environment in which the part has been operated. Such data may termed "environmental data" related to the given component of the aircraft.

In addition to the above, the transferred operational or environmental data from the aircraft 10 can be inferred data or data that is not measured directly but can be inferred using one or more measured data either in combination of understanding the physics of the part or the system or not. In one non-limiting example, some temperatures inside an engine cannot be directly measured but can be inferred by knowing engine cycle physics and other directly measured parameters that can include environmental parameters, engine sensor parameters, or design specific parameters.

Consider, by way of non-limiting example, that one might want to predict the operational life of an airfoil blade 30 located within the one or more propulsion engines 12 of the aircraft. It will be understood that operational data and environmental data for the airfoil blade 30 in multiple aircraft will have been collected by the data operations center 26.

In addition to the operational and environmental data, there will have been periodic visual inspections of the airfoil blade 30 in multiple aircraft, for example, during routine maintenance operations. Visual inspection can include eyesight observation by inspectors, as well as instrumental observation with the aid of electro-optical equipment such as a borescope or the aid of radiometric or spectrographic systems, and image collectors. Such observation data can be enhanced with image enhancement and well established predictive algorithms. Modeling of the observational data with processing-intensive routines such as provided by finite element analysis can further enhance the observational data.

Figure 2:
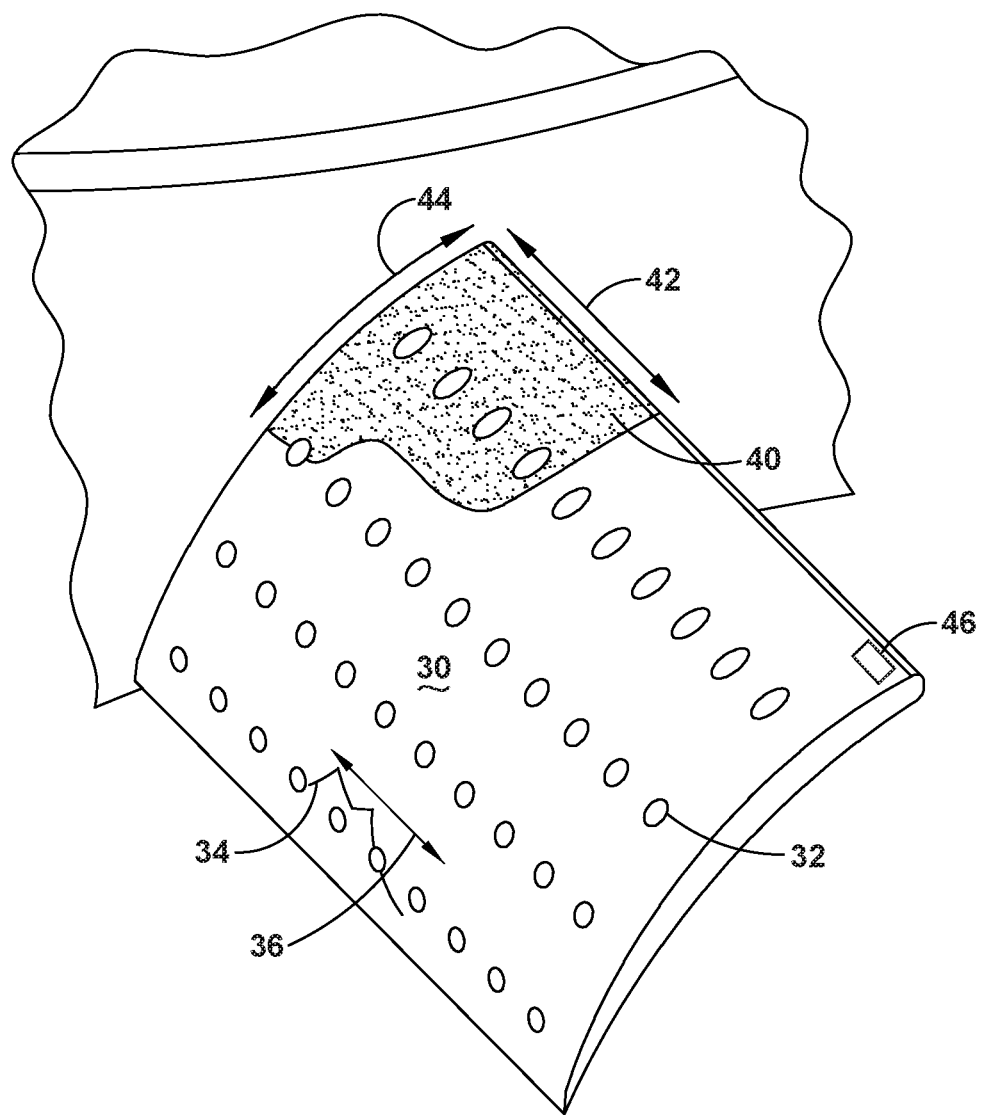
FIG. 2 is a perspective view of an airfoil blade that can be included in an aircraft engine of the aircraft of FIG. 1.

As illustrated in FIG. 2, by way of example, consider a visual inspection of the airfoil blade 30 which includes cooling holes 32. A crack 34 in the airfoil blade 30 may be observed during a visual inspection. The crack 34 can have a crack length 36 that illustrates, by way of non-limiting example, a one dimensional measurement of the crack 34. The crack length 36 can be measured as the length of a relatively linear line connecting one end of the crack to another end. It is also contemplated that the crack length 36 can be the length of a non-linear line that follows the contours of the crack from one end to the other. It is further contemplated that the crack length 36 can be measured as the number of the cooling holes 32 affected by the crack 34.

Alternatively, it is contemplated that the crack length 36 can be calculated using known methods such as, but not limited to, determining the crack length 36 using a multidimensional method that follows the shape or perimeter of the crack 34.

There can also be observed an area of thermal barrier coating loss 40 on the airfoil blade 30 with a length 42 and a width 44. The length 42 can be the measurement of the most extended dimension and the width 44 can be orthogonal to the length 42 representing the greatest extension in a second dimension. Alternatively, the area of thermal barrier coating loss 40 can be measured as a number of pixels, or calculated using other known area dimensional estimating techniques.

By way of further non-limiting example, there can be an area of oxidation 46 on the airfoil blade 30. However measured, the crack length 36, the area of thermal barrier coating loss 40, or the area of oxidation 46 are non-limiting examples of observational data obtained during a physical inspection of the airfoil blade 30. The observational data from the physical inspection will be communicated to the data operations center 26. It will be understood that the physical inspection can include a visual inspection and that there will be multiple physical or visual inspections for a single aircraft as well as multiple aircraft for the airfoil blade 30. The data therefrom can be termed "observed distress data."

Figure 3:
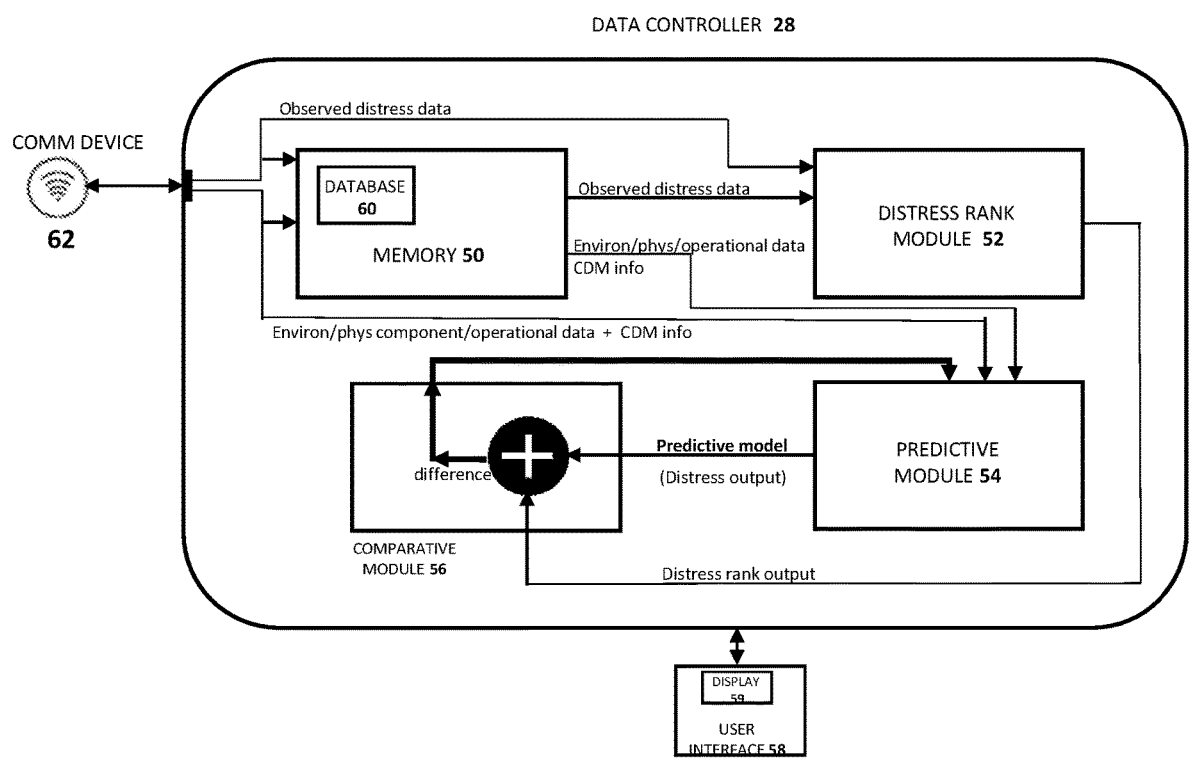
FIG. 3 is schematic view of the data controller of FIG. 1.

FIG. 3 illustrates a data controller 28 that might be used to effect the model or method of predicting distress for the exemplary airfoil blade 30. The data controller 28 can be provided with a memory 50, a distress rank module 52, a predictive module 54, and a comparative module 56. The data controller 28 can couple to a user interface 58. The user interface 58 can be used to enter data into the data controller 28 or to provide information to a user upon request or in response to the entered data. Information that can be provided via the user interface 58 is further discussed with respect to FIG. 4. A display screen 59 can be included in communication with or coupled to the user interface 58. The display screen 59 can be any suitable display screen such as a liquid crystal display (LCD) screen, a plasma screen, a smart glass screen, or any other type of screen or medium on which information can be displayed.

Optionally, the data controller 28 can couple to one or more wireless communication devices 62 for sending and receiving information, such as, but not limited to, operational data, environmental data and/or observed distress data in the data operations center 26. It is contemplated that the one or more wireless communication devices 62 are capable of establishing a communication link with the aircraft 10, the maintenance vehicle, or other device capable of communicating information. The wireless communication links and can be any variety of communication mechanism capable of wirelessly linking with other systems and devices and can include, but is not limited to, packet radio, satellite uplink and/or downlink, Wireless Fidelity (WiFi), WiMax, Bluetooth, ZigBee, 3G wireless signal, code division multiple access (CDMA) wireless signal, global system for mobile communication (GSM), 4G wireless signal, 5G wireless signal, long term evolution (LTE) signal, Ethernet, or any combinations thereof. It will also be understood that the particular type or mode of wireless communication is not critical to aspects of the present disclosure, and later-developed wireless networks are certainly contemplated as within the scope of the present disclosure.

The memory 50 can include or communicate with a database 60. For example, the database 60 can store sets of operational data, environmental data, design specific data and/or observed distress data received from the data operations center 26. The database 60 can be more than one database accessible to or in communication with the data controller 28. Design specific data can include, by way of non-liming example, information related to manufacturing location, time, materials, or technique.

The distress rank module 52 uses a set of observed distress data to determine a distress rank output, which, in the present illustration, would be a distress rank output related to the airfoil blade 30. The predictive module 54 obtains a set of environmental data or a set of operational data or related to the physical component, which, in this case is the airfoil blade 30. It formulates a kernel using parameters of the environmental data and/or the operational data and a cumulative damage model (CDM) related to the physical component. It further generates a predictive model based on the kernel that provides a distress output related to the physical component, which, in this case is the airfoil blade 30. It is contemplated that the distress rank module 52 or the predictive module 54 can communicate with the database 60 to obtain additional information when determining the distress rank output or the distress output for the physical component.

A comparative module 56 communicates with the distress rank module 52 and the predictive module 54 to obtain the distress rank output and the distress output for the physical component. The comparative module 56 compares a value of the distress rank output to a value of the distress output and communicates any difference back to the predictive module 54. Additionally or alternatively, the comparative module 56 can communicate any difference to the distress rank module 52 or user interface 58.

It is contemplated that the data controller 28 can in fact be in distributed computing environments where tasks are performed by local and remote processing devices that are linked (either by hardwired links, wireless links, or by a combination of hardwired or wireless links) through a communication network. In a distributed computing environment, program modules can be located in both local and remote memory storage devices.

Figure 4:
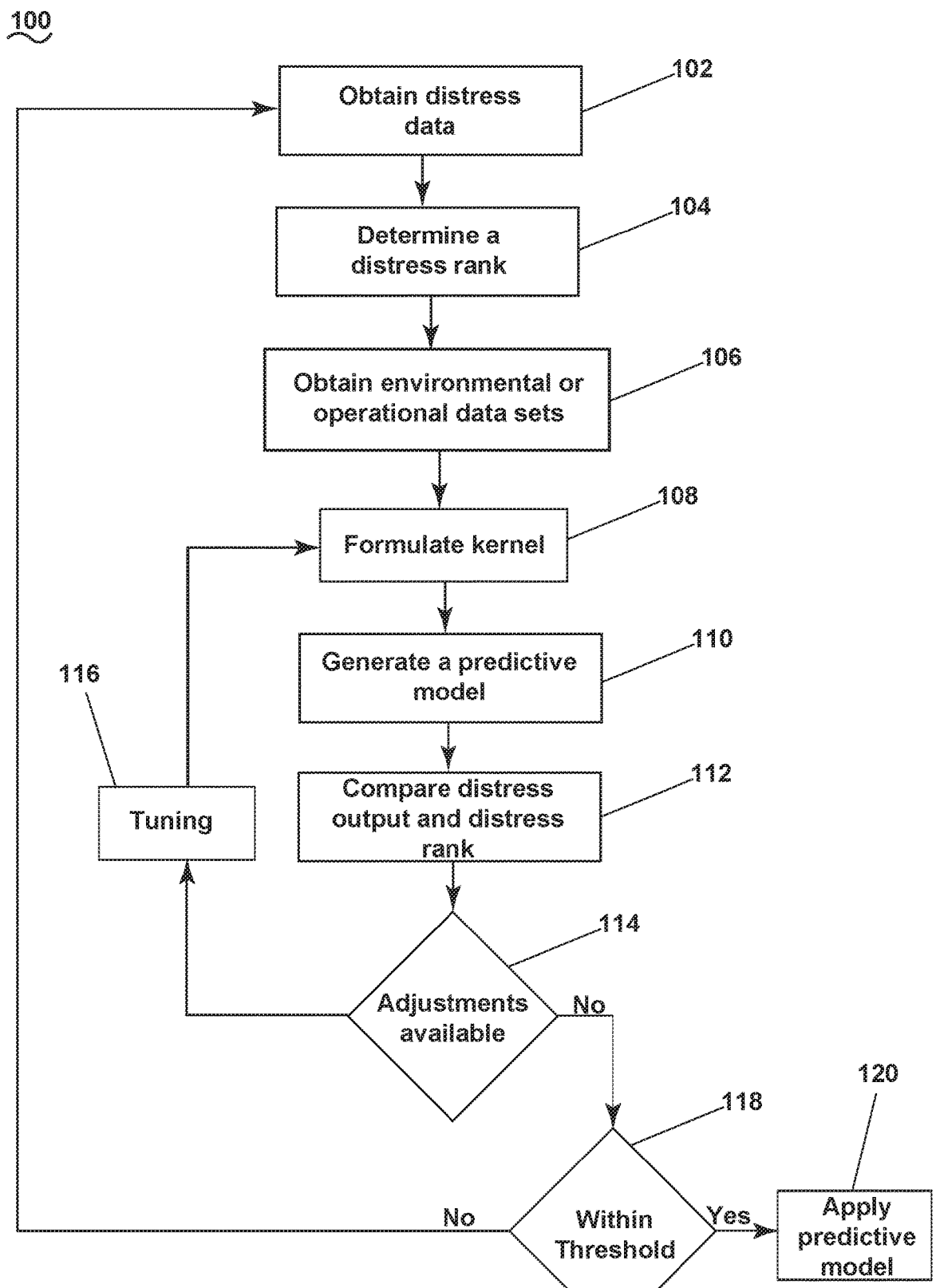
FIG. 4 is a flow chart illustrating a method for predicting distress.

FIG. 4 illustrates a method 100 of predicting distress on any physical component, conducted using the controller 28. At step 102 of the method 100, a first set of distress data for the physical component is obtained. The first set of distress data will preferably include 20 data points or more. At step 104, a distress rank of the physical component is determined based on first set of distress data. The distress rank module 52 can output the distress rank to the comparative module 56.

At step 106, a set of environmental data related to the physical component or a set of operational data related to the physical component or both are obtained, for example, from the database 60, or directly from the data operations center 26.

A kernel can be formulated at step 108 using parameters from the set of environmental data, the set of operational data, or the cumulative damage model related to the physical component. The predictive module 54 can use additional information from the database 60 to formulate the kernel. For example, the set of design specific data related to the physical component might be include as a parameter in formulating the kernel. The set of design specific parameters can be obtained, for example, from the database 60. It is contemplated that kernel can be formulated using a variety of parameters related to the physical component.

At step 110, a predictive model is generated based on the kernel that provides a distress output related to the physical component. The distress output is transmitted to the comparative module 56.

The distress output is compared to the distress rank at step 112. The comparative module 56 can compare the distress output to the distress rank to output a difference.

At step 114, if adjustments to the parameters are available, the predictive model is tuned at step 116 by adjusting at least one parameter of the kernel, which is then reformulated at step 108, generating an updated predictive model at step 110. The distress output of the updated predictive model is then compared again to the distress rank at step 112. If further adjustments are available, then further tuning is done, repeating steps 108-116 until adjustments to the parameters are no longer available or needed to place the difference within the threshold. If, at step 118, the difference is within the threshold or satisfies the threshold, the updated predictive model can be applied to the physical component at step 120 to predict distress on the physical component. However, if at 118, the difference remains outside the threshold or does not satisfies the threshold, the method 100 can be restarted at step 102 with a different or larger set of distress data and/or a different or larger set of environmental or operational data. An example of a different or larger set of distress data can include a second set of distress data where tuning the predictive model can be based on the first set of distress data, the second set of distress data, or a combination of the first and second sets of distress data. By way of non-limiting example, the second set of distress data can include 5 data points or more. It is contemplated that any number of sets of distress data can be used to tune the predictive model. It is further contemplated that any combination of distress data from the one or more sets of distress data can be used to tune the predictive model. Optionally, when the method 100 restarts at 102, the kernel can be reformulated using different combinations of parameters or different CDM models.

The threshold can be determined using a variety of known methods and often includes specially developed algorithms which can vary between objects. By way of non-limiting example, the threshold can be minimum coefficient of determination, or "R squared" value.

It is contemplated that the threshold can be an "R squared" value of 0.6 or more. Consider the distress output from the updated predictive model as a graphical model that can be applied to one or more distress rank output(s) from the distress rank module 52. Using known methods, the "R squared" value can be calculated, indicating the comparison between the graphical model and the one or more distress rank output(s). The calculated "R squared" value can be compared to the threshold. If at 118, the "R squared" value is greater than or equal to 0.6 then the updated predictive model can be applied to the physical component at step 120. However, if at 118, the "R squared" is less than 0.6, then the method 100 can be restarted at step 102. It is further contemplated that additional algorithms can be executed to assist in determining what aspects of the data, parameters, or models can be adjusted prior to the method 100 restarting at 102.

Consider now the physical component to be the aforementioned airfoil blade 30. The distress data will include observations and data about the crack length 36 and the area of thermal barrier coating loss 40. Additionally, the distress data can be obtained from multiple aircraft.

Distress ranking of physical components is known in the art and often includes specially developed algorithms which can vary between objects, as can the observed distress data used in the algorithms. It is further contemplated that the distress rank module 52 can obtain additional information about the object or previous observational data from the database 60 when calculating the distress rank of an object such as, but not limited to a location of previous repair or replacement, age of the one or more objects, or trend data gathered from similar objects. However, for illustrative purposes, we will consider distress rank as a causation based on crack length and area of thermal barrier coating loss.

Consider the crack length 36 of the crack 34 to be a length 2.25 inches and the area of thermal barrier coating loss 40 have the length 42 of 3.00 inches and the width 44 of 3.25 inches. Therefore the area of thermal barrier coating loss 40 is 9.75 square inches.

By way of non-limiting example, at step 102 the distress rank module 52 can obtain the distress data that includes the dimension of 9.75 square inches experiencing thermal barrier coating loss and assign, for example, a distress rank of 2. The distress rank module 52 also considers distress data that includes the dimension of 2.25 inches of cracking and assigns, for example, a rank of 4. The distress rank module 52 can then combine them to determine a distress rank output of 6 for the airfoil blade 30. If the distress data was obtained from multiple aircraft, a distress rank output for each airfoil blade in which data was collected can be communicated to the distress rank module 52 as a set of distress data.

Let the combination of rank 2 and rank 4 be distress rank 6, resulting in a distress rank output of 6 from the distress rank module 52 at step 104. Alternatively, the combination of rank 2 and rank 4 can result in a distress rank output having a different value if a weighting is assigned to different observed distress data. However, for illustrative purposed, let the distress rank 6 be the output to the comparative module 56.

At step 106, the set of environmental data, the set of operational data, or the set of design specific data related to the airfoil blade 30 can be obtained by the predictive module 54 using the transmitted data from the aircraft 10 or the additional information from the database 60. The set of environmental data, the set of operational data, or the set of design specific data can be arranged or organized as parameters by the predictive module 54. If the distress data was obtained from multiple aircraft, step 106 can obtain the set of environmental data, the set of operational data, or the set of design specific data related to each airfoil blade.

Further, at least a portion of the transmitted data from the aircraft 10 to the predictive module 54 can be used to develop a cumulative damage model (CDM) related to the airfoil blade 30. The CDM can contribute to determining the physical phenomenon driving distress of the airfoil blade 30 using a physics-based model of the related to the airfoil blade's 30 lifecycle. The CDM can also be used as a parameter.

At step 108, the kernel related to the airfoil blade 30 can be formulated by the predictive module 54. The kernel can be formulated using parameters that can include the set of environmental data, the set of operational data, the set of design specific data, or the CDM.

The kernel can be used to generate a predictive model that can provide the distress output for the airfoil blade 30. It is contemplated that in addition to the transferred data from the aircraft 10, additional data from the database 60 can be used to develop the CDM or formulate the kernel.

At step 110, the predictive model related to the airfoil blade is used by the predictive module 54 to provide the distress output to the comparative module 56. For our example of the airfoil blade 30, let a value of the distress output to the comparative module 56 be 250. Optionally, if the distress data was obtained from multiple airfoil blades, the predictive module 54 can provide the distress output to the comparative module 56 for each airfoil blade.

At step 112, the comparative module 56 compares the distress output value (here, 250) to the distress rank value (here, 6); calculating a difference. It is contemplated that the distress output is scaled before comparison to the distress rank. By way of non-liming example, let the scale be one-fiftieth. Therefore, the value 250 can be scaled to the distress output of 5. The comparative module 56 then calculates the difference between 5 and 6. If the distress data was obtained from multiple airfoil blades, the comparative module 56 can compare the distress output to the distress rank for each airfoil blade.

At 114 and 116, for illustrative purposes, consider the adjustments to the parameters during tuning to be an increase in weight of the environmental parameter in the kernel of the prediction model. The updated prediction model for the airfoil blade 30 provides the distress output 290; which converts to 5.8. Since 5.8 is closer to 6 than 5, the added with to the environmental parameter in the kernel is maintained. If no other change in parameters decreases the difference between the distress output and the distress rank, the difference is then assessed at 118. Let a difference of 0.2 be considered within the threshold. The updated predictive model is ready to be used for the airfoil blade 30.

Using the display screen 59 on the user interface 58, the predictive model can prepare a display illustrating the predicted distress on the airfoil blade 30 (or other physical component). The display can include graph that can, for example, illustrate damage or distress rank verses cycles. The damage or distress rank verses cycles graph can be used to determine an inspection schedule or a maintenance schedule for the airfoil blade 30 (or other physical component).

Optionally, the updated predictive model can be used to develop design changes to the airfoil blade 30.

The aspects of the present disclosure include obtaining data for formulating a distress rank and a prediction model, wherein the prediction model can be improved using the distress data. The technical effect is that the aspects described herein enable tuning of a predictive model that can be applied to a physical component. One advantage that can be realized is superior prediction capabilities for physical components as compared with conventional systems. The superior prediction capabilities can improve inspection schedules or maintenance schedules. In addition, the superior prediction capabilities can reduce unplanned operational disruptions.

Another advantage to increased prediction capabilities is the ability to predict distress and lifetime of parts still in the design phase. This will improve future designs.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of predicting distress on a physical component, the method comprising:
   receiving, via one or more sensors communicatively coupled to the physical component, a plurality of data associated with the physical component;
   transferring observed distress data of the plurality of data associated with the physical component, to a data controller, via the one or more sensors being communicatively coupled to the data controller, and obtaining from a distress rank module, a distress rank output value being associated with the observed distress data;
   generating, via a predictive module, a predictive model representative of a failure of the physical component based on parameters including at least one of environmental data, operational data and modeling data associated with the physical component, each of the at least one environmental data, operational data and modeling data being obtained by the predictive module;
   wherein the predictive model provides a distress output value;
   comparing, via a comparative module, the distress output value to the distress rank output value to output a mathematical difference, the distressed output value being scaled before being compared to the distress rank output value; and
   communicating the mathematical difference to the predictive module; and
   tuning, via the predictive module, the predictive model by adjusting at least one parameter of the parameters and generating an updated predictive model, the updated predictive model providing an updated distress output value, the updated distressed output value being generated as a computational model;
   wherein the updated predictive model is generated when the mathematical difference fails to satisfy a predetermined threshold; and
   predicting distress of the physical component responsive to one of the predictive model and the updated predictive model.

2. The method of predicting of claim 1, wherein the updated predictive model provides an updated distress output value;
   comparing, via the comparative module, the updated distress output value to the distress rank output value to output an updated mathematical difference; and
   communicating the updated mathematical difference to the predictive module and tuning, via predictive module, another updated predictive model.

3. The method of claim 1, wherein the observed distress data includes a first set of distress data that includes 20 data points or more.

4. The method of claim 3, further including obtaining a second set of distress data wherein tuning the predictive model is based on one of the first set of distress data or the second set of distress data.

5. The method of claim 4, wherein the second set of distress data includes 5 data points or more.

6. The method of claim 1, further including preparing a display illustrating the predicted distress on the physical component.

7. The method of claim 6, wherein the display is a graph.

8. The method of claim 1, wherein the physical component is a component of an aircraft.

9. The method of claim 1, wherein the at least one parameter is one of operation parameters of the physical component, design specific parameters specific to the physical component, or environmental parameters of the physical component.

10. The method of claim 3, wherein the first set of distress data is based in part on physical inspection of the physical component.

11. The method of claim 1, wherein performing the method is part of modifying a design change of the physical component.

12. The method of claim 1, wherein performing the method is part of developing an inspection schedule of the physical component.

13. The method of claim 1, wherein the method further comprises restarting the method by obtaining new observed distress data.

14. The method of claim 1, wherein the method further comprises using a set of design specific data related to the physical component as a parameter of the parameters.

15. The method of claim 1, wherein tuning the predictive model includes reformulating the parameters.

16. The method of claim 15, wherein the reformulating the parameters is based on a different cumulative damage model of the modeling data.

17. A system for predicting distress on a physical component, the system comprising:
   a controller coupled to a memory configured for storing observed distress data, environmental data, operational data and modeling data related to a physical component;
   one or more sensors being (i) communicatively coupled to the controller and the physical component and (ii) configured for transferring the observed distress data, the environmental data, the operational data and the modeling data to the controller;
   a distress rank module coupled to the memory configured to receive the observed distress data and generate a distress rank output value associated with the observed distress data;
   a predictive module coupled to the distress rank module and to the memory, configured to receive the environmental data and the operational data and the modeling data as parameters from the memory and generate a predictive model of a failure of the physical component using the parameters, the predictive model providing a distress output value; and
   a comparative module in communication with the distress rank module and the predictive module and configured to:
   (i) compare the distress output value to the distress rank output value to output a mathematical difference, the distressed output value being scaled before being compared to the distress rank output value; and
   (ii) communicate the mathematical difference to the predictive module;
   wherein the predictive module is further configured to tune the predictive model by adjusting at least one parameter of the parameters and generate an updated predictive model providing an updated distress output value, the updated distress output value being generated as a computational model;
   wherein the updated predictive model is generated when the mathematical difference fails to satisfy a predetermined threshold; and wherein distress of the physical component is predicted using one of the predictive model and the updated predictive model.

18. The system of claim 17, wherein the predictive module can further reformulate the parameters when the difference between the distress output and the distress rank is not within the threshold.

19. The system of claim 18, wherein reformulating the parameters is based on a different cumulative damage model of the modeling data.

20. The system of claim 17, wherein distress rank module can further determine the distress rank output value of the physical component based on a first set of distress data or a second set of distress data accessed from the memory.

21. The system of claim 17, wherein the controller can further apply the updated predictive model to a design change related to the physical component.

* * * * *